United States Patent
Liggins et al.

(10) Patent No.: US 9,932,027 B2
(45) Date of Patent: Apr. 3, 2018

(54) DYNAMIC DECELERATION CONTROL FOR HYBRID VEHICLE TO ACHIEVE A CONSISTENT OVERRUN RESPONSE

(71) Applicant: Jaguar Land Rover Limited, Coventry (GB)

(72) Inventors: Steve Liggins, Coventry (GB); Simon Message, Coventry (GB); Richard Kirkman, Coventry (GB); Matthew Hancock, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 270 days.

(21) Appl. No.: 14/908,242

(22) PCT Filed: Aug. 21, 2014

(86) PCT No.: PCT/EP2014/067838
§ 371 (c)(1),
(2) Date: Jan. 28, 2016

(87) PCT Pub. No.: WO2015/025003
PCT Pub. Date: Feb. 26, 2015

(65) Prior Publication Data
US 2016/0167638 A1 Jun. 16, 2016

(30) Foreign Application Priority Data
Aug. 21, 2013 (GB) .................................. 1314992.7

(51) Int. Cl.
*B60W 20/00* (2016.01)
*B60K 6/20* (2007.10)
(Continued)

(52) U.S. Cl.
CPC ............... *B60W 20/10* (2013.01); *B60K 6/20* (2013.01); *B60K 6/442* (2013.01); *B60K 6/48* (2013.01);
(Continued)

(58) Field of Classification Search
None
See application file for complete search history.

(56) References Cited

U.S. PATENT DOCUMENTS 6,314,347 B1 * 11/2001 Kuroda .................. B60K 6/442
701/22
8,634,939 B2 * 1/2014 Martin .................. B60W 20/00
180/165

(Continued)

FOREIGN PATENT DOCUMENTS

CN          1751923 A     3/2006
DE   10 2010 039 642 A1  2/2012
(Continued)

OTHER PUBLICATIONS

First Office Action Summary corresponding to Chinese Application No. 201480045842.7, dated May 18 2017.
(Continued)

*Primary Examiner* — Colby M Hansen
(74) *Attorney, Agent, or Firm* — Myers Bigel, P.A.

(57) ABSTRACT

A hybrid electric vehicle is capable of direct drive by internal combustion engine, electric motor, or both. In order to provide a consistent overrun response, a torque controller determines an appropriate deceleration characteristic according to, for example, transmission speed ratio, vehicle gradient and vehicle mass, and commands the electric motor and the engine to contribute a negative torque which meets the required deceleration characteristic. A 'tip' function modifies the characteristic in the event of a change com-
(Continued)

manded by the vehicle driver, for example a change of speed ratio.

11 Claims, 2 Drawing Sheets

(51) Int. Cl.
| | |
|---|---|
| *B60K 6/48* | (2007.10) |
| *B60W 30/18* | (2012.01) |
| *B60W 20/10* | (2016.01) |
| *B60W 10/02* | (2006.01) |
| *B60W 10/06* | (2006.01) |
| *B60W 10/08* | (2006.01) |
| *B60W 20/14* | (2016.01) |
| *B60K 6/442* | (2007.10) |

(52) U.S. Cl.
CPC ............ *B60W 10/02* (2013.01); *B60W 10/06* (2013.01); *B60W 10/08* (2013.01); *B60W 20/00* (2013.01); *B60W 20/14* (2016.01); B60W 2030/18081 (2013.01); B60W 2510/1005 (2013.01); B60W 2520/10 (2013.01); B60W 2520/105 (2013.01); B60W 2530/10 (2013.01); B60W 2540/10 (2013.01); B60W 2540/16 (2013.01); B60W 2540/30 (2013.01); B60W 2550/142 (2013.01); B60W 2710/025 (2013.01); B60W 2710/0627 (2013.01); B60W 2710/0666 (2013.01); B60W 2710/083 (2013.01); B60W 2720/106 (2013.01); B60Y 2200/92 (2013.01); B60Y 2300/182 (2013.01); B60Y 2300/43 (2013.01); B60Y 2300/60 (2013.01); Y02T 10/6221 (2013.01); Y02T 10/6286 (2013.01); Y02T 10/7258 (2013.01); Y10S 903/93 (2013.01)

(56) References Cited

U.S. PATENT DOCUMENTS

| | | | |
|---|---|---|---|
| 9,682,630 B2 * | 6/2017 | Chupin | ................. B60W 50/14 |
| 2005/0099146 A1 | 5/2005 | Nishikawa et al. | |
| 2006/0060399 A1 | 3/2006 | Tabata et al. | |
| 2006/0064225 A1 | 3/2006 | Tabata et al. | |
| 2007/0061063 A1 | 3/2007 | Bauer et al. | |
| 2007/0106447 A1 | 5/2007 | Ogawa | |
| 2012/0303196 A1 | 11/2012 | Kieser et al. | |
| 2013/0131901 A1 | 5/2013 | Yamagata et al. | |
| 2015/0039169 A1* | 2/2015 | Dextreit | ............ B60W 50/0097 701/22 |

FOREIGN PATENT DOCUMENTS

| | | |
|---|---|---|
| EP | 1 160 119 A1 | 12/2001 |
| JP | 2006062608 A | 3/2006 |
| JP | 2009196454 A | 9/2009 |
| WO | WO 2013/153597 A1 | 10/2013 |

OTHER PUBLICATIONS

Office Action Summary, Japanese Application No. 2016-535480, dated Apr. 4, 2017, 9 pages.
Combined Search and Examination Report, GB 1414875.3, dated Jan. 28, 2015, 5 pages.
Combined Search and Examination Report, GB 1314992.7, dated Mar. 26, 2014, 6 pages.
Notification of Transmittal of the International Search Report and the Written Opinion, PCT/EP2014/067838, dated Nov. 24, 2014, 11 pages.

* cited by examiner

DYNAMIC DECELERATION CONTROL FOR HYBRID VEHICLE TO ACHIEVE A CONSISTENT OVERRUN RESPONSE

RELATED APPLICATIONS

This application is a 35 U.S.C. § 371 national stage application of PCT Application No. PCT/EP2014/067838, filed on Aug. 21, 2014, which claims priority from Great Britain Patent Application No. 1314992.7 filed on Aug. 21, 2013, the contents of which are incorporated herein by reference in their entireties. The above-referenced PCT International Application was published in the English language as International Publication No. WO 2015/025003 A1 on Feb. 26, 2015.

TECHNICAL FIELD

This invention relates to a hybrid vehicle, typically a hybrid having an internal combustion engine and an electric motor each capable of driving vehicle wheels.

BACKGROUND TO THE INVENTION

Hybrid vehicles are well known, and typically comprise an internal combustion engine and an electric motor powered by a battery. The vehicle may be powered by the engine, by the motor, or by a combination of engine and motor. In the latter case sophisticated controls have been developed to ensure that the wheel torque demanded by the driver, and any additional torque to charge the battery, can be delivered by proportioning the torque delivered by the engine and motor so as to meet a pre-determined target, which may be based for example on one of minimized fuel consumption, maximized range, and maximized vehicle performance. The optimum state of charge of the battery typically varies according to the pre-determined target.

The vehicle battery may be recharged by the usual generator of the engine or by the motor acting as a generator; in the latter case the motor may be driven by the wheels (regenerative braking) or by the engine.

In order to provide familiar feedback to the driver, who may be more familiar with the characteristics of a more standard non-hybrid vehicle, it is desirable to provide a substantially consistent degree of deceleration on overrun— overrun is defined in this specification as slowing of the vehicle without assistance of braking, typically at a substantially zero position of the accelerator pedal.

In a hybrid vehicle, providing consistent deceleration is somewhat problematic. If the engine is running and fully engaged with the driveline, a hybrid vehicle can exhibit a normal deceleration in response to foot-off of the accelerator pedal provided that additional negative torque from the motor is avoided.

However if the engine is disconnected from the driveline and the vehicle is operating in electric-only mode, retardation can be provided solely by the motor (acting as generator). In this circumstance it may be possible to determine empirically the deceleration torque applied by the engine (the torque to overcome friction and pumping losses) and cause the motor to provide the equivalent deceleration torque by acting as a generator (and thus recharging the battery).

A difficulty arises if the battery is fully charged, because the motor control system may prevent the motor acting as a generator, so that the normal degree of deceleration cannot be achieved.

In addition, a negative torque (deceleration) target based on friction and pumping losses of the engine takes no account of external vehicle conditions which are apparent to the vehicle driver, such as gradient, speed ratio of the transmission and vehicle mass; changes in these conditions will cause the vehicle driver to expect a different deceleration profile.

Provision of consistent deceleration becomes more difficult when the motor (as generator) provides only a portion of the negative torque, and the engine provides the remainder via a slipping clutch.

Accordingly a better method and means of achieving consistent overrun is required.

SUMMARY OF THE INVENTION

Aspects of the invention are defined in the appended claims.

According to an aspect of the invention, there is provided a method of obtaining a consistent overrun response of a hybrid electric vehicle capable of direct drive by internal combustion engine, by electric motor, or by a combination thereof, said motor being capable of operation as a generator, and said method comprising determining a target deceleration; determining a modified target deceleration based upon vehicle speed, transmission speed ratio, gradient, vehicle mass and vehicle mode; measuring real-time vehicle deceleration; continually determining the difference between said modified target deceleration and said real-time deceleration; and commanding said engine and/or motor to provide said difference by generating a negative torque.

The consistent overrun response provides a normal feeling to the driver throughout driving the vehicle regardless of vehicle conditions. For example, if the battery state of charge is high such that regenerative braking is not available in full, the method utilises engine braking to ensure that the feeling to the driver is consistent with the feeling felt when regenerative braking is available in full.

The target deceleration is typically that of a vehicle operating in engine only mode, i.e. without a motor having an effect upon driveline output torque.

The invention thus provides a dynamic control of deceleration, by continually adjusting the deceleration torque to mimic that of the internal combustion engine alone at times when at least a proportion of the deceleration torque is provided by the motor acting as a generator.

It will be understood that the deceleration torque provided by the motor/generator may itself be dynamic, and subject to the state of charge of the vehicle battery and to other electrical loads on the vehicle. Charging of the vehicle battery is typically under the control of a charge controller responsive to drive output torque, for example an electronic control unit having a processor and a plurality of charging maps or characteristics optimised for different conditions of use of the vehicle.

Dynamic control of deceleration torque is determined by an electronic transmission controller having a processor and a plurality of deceleration maps which give the required deceleration rate under different conditions of use of the vehicle. The transmission controller receives inputs of, for example, road speed, selected speed ratio and gradient in order to determine the appropriate deceleration map, and includes a feedback loop which aims for the actual road speed to closely follow the ideal road speed. The feedback loop may have a refresh rate of 10 mS or better.

Determination of suitable deceleration maps may be by empirical testing of a vehicle to which the invention is to be applied, under various modes of operation.

Aspects of the invention relate to a torque controller of a hybrid vehicle, and to a hybrid vehicle adapted to implement the method of the invention.

Features of the invention will be apparent from the appended claims.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of embodiments shown by way of example only in the following drawing in which:—

DESCRIPTION OF AN EMBODIMENT

Figure 1:
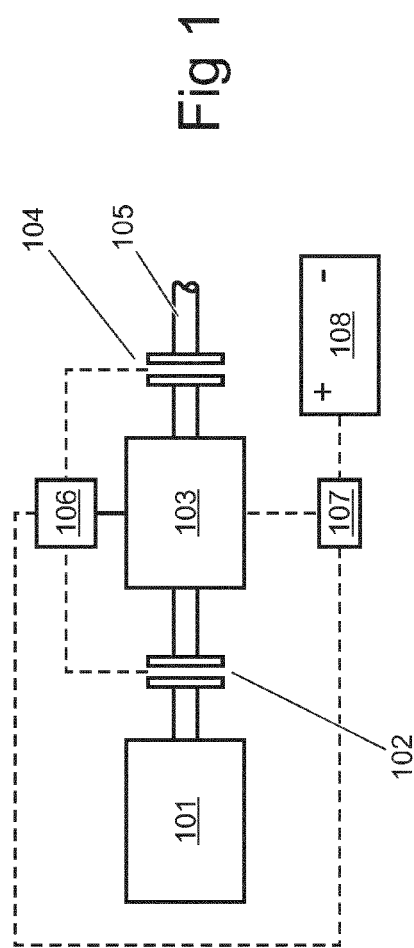
FIG. 1 is a schematic illustration of a parallel hybrid electric vehicle.

With reference to FIG. 1 a parallel hybrid electric vehicle 100 has a drive train consisting of an internal combustion engine 101 whose output is connected via a clutch 102 to the input of an electric motor/generator 103 which in turn has an output for driving the vehicle via a second clutch 104. A drive shaft 105, or the like, connects the output of the clutch 104 to the vehicle driveline, in particular the driving wheels of the vehicle.

A clutch controller 106 controls the clutches 102,104 to transmit more or less drive torque according to requirements, and a torque controller 107 determines whether a battery 108 takes energy from the motor/generator 103 or gives energy to the motor/generator 103.

It will be apparent that the series arrangement of FIG. 1 permits driving solely by the engine 101, in which case the clutches 102 and 104 are fully engaged and the motor/generator 103 is passive. Alternatively the clutch 102 may be fully disengaged, and drive is provided solely by the motor/generator 103.

In a further alternative both the engine 101 and motor/generator 103 may combine to provide an enhanced driving torque, for example for rapid acceleration.

The engine 101 and motor/generator 103 may each also contribute only a proportion of the potential torque. For example engine torque supplied to the driveline may be reduced by conventional methods (e.g. reduced fuelling) or by slipping the clutch 102. Motor torque may be modified by the torque controller 107, particularly if the available charge from the battery 108 is low.

Recharging of the battery may be by opportunistic regenerative braking by the motor functioning as a generator, or directly from a separate generator of the engine, or by the engine driving the motor. In the latter case a proportion of engine output toque may drive the generator 103, and a proportion may be available as output torque to the drive shaft 105.

The controllers 106,107 may communicate to determine the mode of operation so that the proportion of torque delivered by the engine and by the motor/generator meet a pre-determined target optimised for e.g. maximum economy, maximum acceleration or maximum range.

This invention is however not concerned with the interaction between the controllers 106,107, but it will be readily understood that a somewhat complex control program is required to ensure optimised operation for all conditions of vehicle use.

The present invention is concerned with a method and means of providing a consistent overrun response for all potential operating conditions of the engine 101 and the motor/generator 103.

Figure 2:
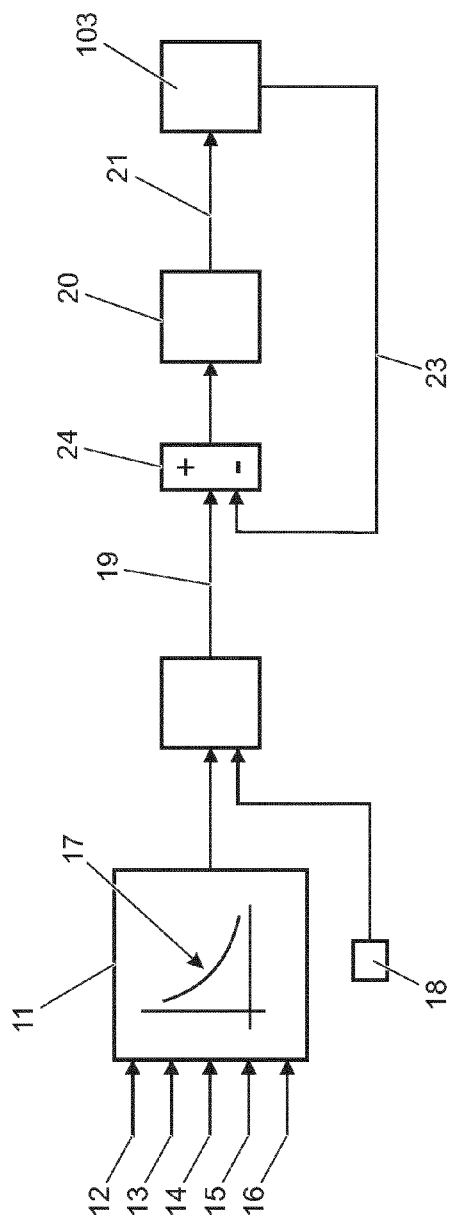
FIG. 2 is a schematic diagram illustrating a first embodiment of the invention.

With reference to FIG. 2 an electronic torque controller 11 of a vehicle comprises a plurality of deceleration maps based upon the deceleration characteristics of the vehicle relying solely upon engine braking. Many such maps may be necessary according to for example the selected speed ratio of the vehicle transmission, the road gradient, and the terrain on which the vehicle is travelling. Thus it will be appreciated that deceleration will vary according to the conditions of vehicle use, and for example be more rapid in a lower speed ratio than in a higher speed ratio, less rapid when travelling downhill, more rapid when travelling uphill and more rapid on e.g. sand than on tarmac.

The deceleration maps may be modified according to other external conditions, such as ambient temperature and ambient pressure.

The deceleration maps may be determined empirically by testing a vehicle, and/or may be calculated according to a suitable algorithm. This invention is not concerned with determining deceleration maps, as such.

It is envisaged that a relevant deceleration map will be selected in real-time, not least because downshift or upshift may be commanded whilst the vehicle is decelerating, which may in turn change the anticipated rate of deceleration. The downshift or upshift may be as a response to automatic control of the vehicle, or due to a manual intervention by the vehicle driver.

In order to select the applicable deceleration characteristic, the controller 11 is provided with inputs corresponding to vehicle speed 12, selected speed ratio of the transmission 13, vehicle mode (e.g. normal or sport) 14, terrain type (for example highway, sand, mud, ice, snow, etc.) 15, and gradient (positive or negative) 16. Such inputs are typically in the form of electrical signals available from suitable sensors or from a CANBUS or the like of the vehicle.

Any such input may have a threshold change below which a change of target deceleration is not implemented. For example a gradient change of ±0.5% may be required.

From these inputs 12-16, the controller 11 selects or calculates a target deceleration characteristic 17. A refresh rate of 10 milliseconds or better may be used.

A transmission 'tip' function 18 may be provided to modify the target deceleration characteristic 17 in the event of a manual override during deceleration, for example to take account of a driver request of transmission downshift or a change of terrain mode. A downshift on overrun will for example increase engine speed, and increase the rate of deceleration. The effect of tipping into or out of an altered state using the 'tip' function 18 can be determined empirically, or projected having regard to norms of vehicle performance, so that a modified deceleration characteristic 19 accurately represents the deceleration which may be expected under the input conditions 12-16 when subjected to a tip change.

Typically the modified deceleration characteristic 19 will provide a smooth transition between the previous and the current target deceleration characteristics, so as to give an appropriate feedback to the vehicle driver. The transition may for example be completed within a pre-determined time period of, for example five seconds or less.

The modified characteristic 19 represents a target deceleration which is converted in a processor 20 to a target overrun torque 21 which in turn is applied firstly to the electric motor/generator 103 of the vehicle. The motor/generator provides regenerative braking and decelerates the vehicle, and the real-time deceleration 23 is applied as closed loop feedback to a comparator 24, which in turn calculates the difference between the deceleration target and the real-time deceleration, to provide an updated target overrun torque 21. By means of closed loop control, a real-time deceleration can approximate very closely to the modified deceleration characteristic 19.

In order to ensure optimised fuel economy, negative torque is provided by the motor/generator 103 if possible. If insufficient negative torque is available from the motor/generator, additional negative torque may be provided from the engine 101 via clutch 102. In this mode the engine fuel supply may be cut-off, and/or pumping torque of the engine may be increased by variation of valve lift or timing.

The arrangement of FIG. 2 provides a feedback control which aims for negative (deceleration) torque to closely match a desired characteristic.

Figure 3:
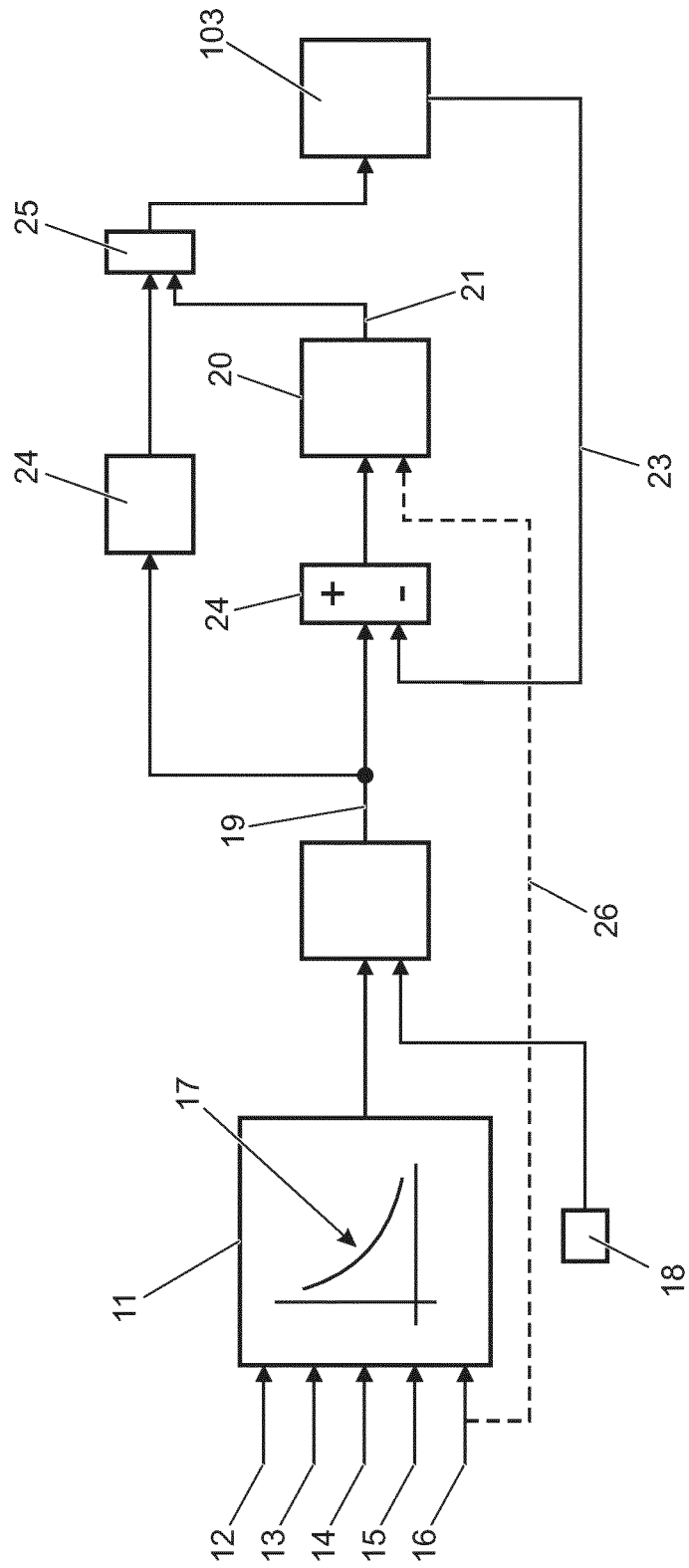
FIG. 3 is a schematic diagram illustrating a second embodiment of the invention.

FIG. 3 illustrates a modification to the arrangement of FIG. 2, which may give a faster response to a negative torque request.

In the modified arrangement, the modified characteristic 19 is additionally provided to an assumption module 24 which outputs the required negative torque to an addition module 25. The target overrun torque 21 is also output to the addition module 25, so that the sum is applied to the motor/generator 103. By this means the initial response of the feedback loop may be improved, so that actual deceleration closely corresponds to the required deceleration.

Further refinement is possible, and for example an input 26 of gradient may be provided directly to the processor 20 in order to prevent too rapid or too slow a response in the event of a gradient being encountered.

Variations and modifications to the invention are possible within the scope of the claims appended hereto.

Aspects of the invention will be apparent from the following numbered paragraphs:

1. A method of obtaining a consistent overrun response of a hybrid electric vehicle capable of direct drive by internal combustion engine, electric motor, or a combination thereof, said motor being capable of operation as a generator, and said method comprising:
   determining a target deceleration by reference to one or more of vehicle speed, transmission speed ratio, gradient, vehicle mass and vehicle mode;
   measuring real-time vehicle deceleration;
   continually determining the difference between said target deceleration and said real-time deceleration; and
   commanding said engine and motor to provide said difference by generating a negative torque.
2. A method according to aspect 1 wherein said difference is provided to the greatest possible extent by said motor.
3. A method according to aspect 1 wherein said difference is provided to some extent by said engine operating in a mode in which the fuel supply is cut-off.
4. A method according to aspect 3 wherein said engine is adapted to supply a negative torque via a clutch, and said clutch is slipped to vary the negative torque output thereof.
5. A method according to aspect 1 and comprising identifying a downshift of transmission speed ratio, modifying said target deceleration by reference to the downshifted transmission ratio, and smoothing the transition to a modified target deceleration.
6. A method according to aspect 5 wherein said transition is completed within a pre-determined time period.
7. A method according to aspect 1 and comprising the preparatory step of detecting a substantially zero movement of the accelerator pedal to implement a requirement for an overrun response.
8. A method according to aspect 1 and comprising determining an estimate of negative torque to achieve a target deceleration, applying said estimate as an initial command to said engine and motor, and thereafter continually determining said difference and commanding said engine and motor to provide said difference.
9. A method according to aspect 1 and comprising:
   continually monitoring gradient,
   detecting a change of gradient exceeding a gradient threshold, and
   adjusting said target deceleration according to a gradient change exceeding a gradient threshold.
10. A torque controller of a hybrid electric vehicle, said torque controller comprising a processor and a memory having a plurality of deceleration characteristics for said vehicle, and said processor being adapted to implement the method of aspect 1.
11. A hybrid electric vehicle capable of direct drive by internal combustion engine, electric motor or a combination thereof, said vehicle being adapted to implement the method of aspect 1.

The invention claimed is:

1. A method of obtaining a consistent overrun response of a hybrid electric vehicle capable of direct drive by internal combustion engine, electric motor, or a combination thereof, said electric motor being capable of operation as a generator, said method comprising:
   determining a target deceleration by reference to one or more of vehicle speed, transmission speed ratio, gradient, vehicle mass and vehicle mode;
   measuring real-time vehicle deceleration;
   continually determining a difference between said target deceleration and said real-time deceleration;
   commanding said internal combustion engine and/or electric motor to provide said difference by generating a negative torque;
   identifying a downshift of transmission speed ratio;
   modifying said target deceleration by reference to the downshifted transmission ratio; and
   smoothing a transition to the modified target deceleration.
2. The method of claim 1, wherein said difference between said target deceleration and said real-time deceleration is provided by said electric motor.
3. The method of claim 1, wherein said difference between said target deceleration and said real-time deceleration is provided by said internal combustion engine operating in a mode in which a fuel supply is cut-off.
4. The method of claim 3, wherein said internal combustion engine is adapted to supply the negative torque via a clutch, and said clutch is slipped to vary a negative torque output thereof.
5. The method of claim 1, wherein said transition is completed within a pre-determined time period.

6. The method of claim 5, wherein the modified target deceleration is determined in an event of a driver request of transmission downshift.

7. The method of claim 1, further comprising a preparatory step of detecting a substantially zero movement of an accelerator pedal to implement a requirement for an overrun response.

8. The method of claim 1, further comprising determining an estimate of negative torque to achieve a target deceleration, applying said estimate as an initial command to said internal combustion engine and electric motor, and thereafter continually determining said difference and commanding said internal combustion engine and/or electric motor to provide said difference.

9. The method of claim 1, further comprising:
 continually monitoring gradient,
 detecting a change of gradient exceeding a gradient threshold, and
 adjusting said target deceleration according to a gradient change exceeding a gradient threshold.

10. A torque controller of a hybrid electric vehicle, said torque controller comprising a processor and a memory having a plurality of deceleration characteristics for said vehicle, and said processor being adapted to implement the method of claim 1.

11. A hybrid electric vehicle capable of direct drive by internal combustion engine, electric motor or a combination thereof, said vehicle being adapted to implement the method of claim 1.

* * * * *